United States Patent
St-Denis et al.

(10) Patent No.: US 12,289,165 B2
(45) Date of Patent: Apr. 29, 2025

(54) COUNTING PACKET LOSS IN SEQUENCE RECOVERY METHOD

(71) Applicant: NXP B.V., Eindhoven (NL)

(72) Inventors: Bernard Francois St-Denis, Ottawa (CA); Allen Lengacher, Kanata (CA); Feng Xian, Kanata (CA)

(73) Assignee: NXP B.V., Eindhoven (NL)

( * ) Notice: Subject to any disclaimer, the term of this patent is extended or adjusted under 35 U.S.C. 154(b) by 499 days.

(21) Appl. No.: 17/808,189

(22) Filed: Jun. 22, 2022

(65) Prior Publication Data
US 2022/0416947 A1 Dec. 29, 2022

(30) Foreign Application Priority Data
Jun. 29, 2021 (EP) .................................. 21182604

(51) Int. Cl.
| | | |
|---|---|---|
| *H04L 47/34* | (2022.01) | |
| *H04L 1/00* | (2006.01) | |
| *H04L 1/1607* | (2023.01) | |
| *H04L 1/20* | (2006.01) | |
| *H04L 43/0829* | (2022.01) | |
| *H04L 47/32* | (2022.01) | |

(52) U.S. Cl.
CPC ............ *H04L 1/1628* (2013.01); *H04L 1/003* (2013.01); *H04L 1/203* (2013.01); *H04L 43/0829* (2013.01)

(58) Field of Classification Search
CPC ....... H04L 1/1628; H04L 1/003; H04L 1/203; H04L 43/0829; H04L 1/0091; H04L 1/009
See application file for complete search history.

(56) References Cited

U.S. PATENT DOCUMENTS

2024/0195730 A1* 6/2024 Varga ...................... H04L 45/24

FOREIGN PATENT DOCUMENTS

CN 108173755 B 7/2020

OTHER PUBLICATIONS

Varga and Farkas, FRER Improvements of Replication and Elimination Functions to achieve seamless reset), Mar. 2020, Ericsson (Year: 2020).*
"IEEE Standard for Local and metropolitan area networks—Frame Replication and Elimination for Reliability", IEEE Std 802.1CB-2017, Oct. 27, 2017, pp. 1-102, IEEE, Piscataway, NJ, USA.
Finn, Norman, "Proposed Disposition of Sponsor Ballot Comments (v1) on: IEEE P802.1CB Draft 2.6 Frame Replication and Elimination for Reliability", IEEE Draft, Nov. 7, 2016, pp. 1-13, vol. 802.1cb drafts, No. D2-6-pdis-v1, retrieved from the internet at grouper.ieee.org/groups/802/1/files/private/cb-drafts/d2/802-1CB-D2-6-pdis-v1.pdf on Nov. 7, 2016.

* cited by examiner

*Primary Examiner* — Christopher M Crutchfield
*Assistant Examiner* — Aixa A Guadalupe Cruz (57) ABSTRACT

A sequence recovery method is executed by a node in a time-sensitive network configured to transmit and receive packets The method includes providing a state variable, having a first state in which a packet loss counter is disabled, and a second state in which the packet loss counter is enabled. The packet loss counter can only be incremented to count lost packets when the loss state variable is in the second state. This method enhances the IEEE 802.1CB standard.

18 Claims, 5 Drawing Sheets

COUNTING PACKET LOSS IN SEQUENCE RECOVERY METHOD

CROSS-REFERENCE TO RELATED APPLICATIONS

This application claims the priority under 35 U.S.C. § 119 of European Patent application no. 21182604.5, filed on 29 Jun. 2021, the contents of which are incorporated by reference herein.

BACKGROUND

The present specification relates to sequence recovery methods in a time-sensitive network, and to a node in a time-sensitive network configured to execute a sequence recovery method.

In a time-sensitive network, TSN, packets (or frames) are duplicated and transmitted via multiple paths in the network to a destination node. This ensures that the packet is safely received by the destination node. Each packet is assigned a sequence number at a node in the network which applies a sequence generation function. When a packet is received at a node of the network, the node may review the sequence number of the received packet and eliminate any duplicate or rogue packets. This is called a sequence recovery function.

The IEEE 802.1CB standard defines the current standards for Frame Replication and Elimination for Reliability (FRER) in a TSN. This includes the current standard sequence recovery function. This standard is incorporated herein by reference in its entirety.

SUMMARY

Aspects of the present disclosure are set out in the accompanying independent and dependent claims. Combinations of features from the dependent claims may be combined with features of the independent claims as appropriate and not merely as explicitly set out in the claims.

According to a first aspect of the present disclosure, there is provided a sequence recovery method executed by a node in a time-sensitive network configured to transmit and receive packets. The node has therein a history vector, wherein a first bit of the history vector represents a current highest sequence number accepted by the node and a remaining M bits represent M consecutive sequence numbers lower than the current highest sequence number accepted by the node, a packet loss counter and a state variable, having a first state in which the packet loss counter is disabled and a second state in which the packet loss counter is enabled.

The method comprises setting the packet loss counter to an initial value and setting the state variable to the first state, receiving a first packet having a first sequence number, and configuring the history vector such that the first bit is set and the remaining M bits are unset.

The method further comprises individually receiving a plurality of packets each having a respective sequence number, and for each received sequence number, in response to the sequence number being within a future range, wherein the future range defines a set of consecutive sequence numbers higher than the current highest sequence number accepted by the node, storing the sequence number as the current highest sequence number accepted by the node and updating the history vector accordingly. In response to a set bit being shifted out of the updated history vector when the state variable is in the first state, setting the state variable to the second state. In response to an unset bit being shifted out of the updated history vector, incrementing the packet loss counter only if the state variable is in the second state.

The state variable reduces the risk of packets being incorrectly counted as lost packets following the reset or initialization of the sequence recovery function.

Updating the history vector may comprise updating each of the M bits to represent the M consecutive sequence numbers lower than the current highest sequence number accepted by the node. This process is described in the IEEE 802.1CB standard vector sequence recovery method.

Updating the history vector may comprise shifting each of the bits along the history vector to represent the M consecutive sequence numbers lower than the current highest sequence number accepted by the node, wherein the first bit is set to represent the current highest sequence number accepted by the node.

The remaining M bits of the history vector may represent M consecutive sequence numbers immediately lower than the current highest sequence number accepted by the node.

The state variable may be a Boolean flag.

Optionally, in the first state the state variable has a value of 0 and in the second state the state variable has a value of 1.

It will be appreciated that the packet loss counter is configured to count lost packets in the network. If the packet loss counter is disabled (i.e. if the state variable is in the first state), it cannot increment or count lost packets. If the packet loss counter is enabled (i.e. the state variable is in the second state), it is permitted to count lost packets.

The future range may define M+1 sequence numbers immediately higher than the current highest sequence number accepted by the node.

In response to the sequence number being outside the history vector and the future range, the method may comprise discarding the packet.

In response to the sequence number being within the history vector, the method may comprise updating the history vector such that the bit representing the sequence number is set.

In response to the sequence number being within the history vector, the method may comprise discarding the packet if the bit representing the sequence number in the history vector is already set. Thus, the method may comprise discarding duplicate packets.

It will be appreciated that throughout this disclosure a set bit in the history vector indicates that the corresponding sequence number has been accepted by the node, and an unset bit in the history vector indicates that the corresponding sequence number has not been accepted by the node. Equivalently, this may be reversed.

Optionally, in the history vector, an unset bit has a value of 0 and a set bit has a value of 1.

If a second packet has a second sequence number that is higher than the first sequence number, this means that the second sequence number was generated at a later time than the first sequence number. This does not necessarily mean that the second sequence number was received at the node at a later time than (i.e. after) the first sequence number, as packets may arrive out of sequence. Thus, the 'current highest sequence number' is not necessarily the most recent sequence number received at the node.

It will be appreciated that the current highest sequence number could equivalently be referred to as the current latest sequence number. This is because the highest sequence number is not necessarily the latest sequence number, due to a rollover process. The packet sequence numbers are typically generated using modulo arithmetic (as is the standard practice). The sequence recovery space has a fixed size (e.g. 64K) and so when the maximum (i.e. highest) sequence number is issued (e.g. Hex "FFFF") the sequence number will rollover to the lowest possible sequence number (e.g. Hex "0000"). Thus, sequence number "0000" is considered to be higher (or later) than sequence number "FFFF". This is acceptable if the sequence number "0000" is far removed from "FFFF" (i.e. the sequence number space is sufficiently large).

The method builds on or enhances the IEEE 802.1CB standard vector sequence recovery method. The history vector and the packet loss counter may be as defined in the IEEE 802.1CB standard.

Optionally, the current highest sequence number is defined by a RecovSeqNum variable.

According to a second aspect, the present disclosure provides a node for a time-sensitive network, the node comprising a receiver, a memory and a processor.

The memory is configured to store a current highest sequence number accepted by the node, a packet loss counter, and a state variable having a first state in which the packet loss counter is disabled and a second state in which the packet loss counter is enabled. The memory is further configured to store a history vector, wherein a first bit of the history vector represents the current highest sequence number accepted by the node and a remaining M bits represent M consecutive sequence numbers lower than the current highest sequence number accepted by the node.

The processor is configured to set the packet loss counter to an initial value and set the state variable to the first state. In response to the receiver receiving a first packet having a first sequence number, the processor configures the history vector to set the first bit, wherein the remaining M bits are unset.

In response to the receiver individually receiving a plurality of packets each having a respective sequence number, for each sequence number received, the processor is configured to, in response to the sequence number being within a future range, wherein the future range defines a set of consecutive sequence numbers higher than the current highest sequence number accepted by the node, store the sequence number in the memory as the current highest sequence number accepted by the node and update the history vector accordingly. In response to a set bit being shifted out of the updated history vector when the state variable is in the first state, the processor is configured to set the state variable to the second state. In response to an unset bit being shifted out of the updated history vector, the processor is configured to increment the packet loss counter only if the state variable is in the second state.

The processor may be configured to perform the sequence recovery method of any embodiment or example of the first aspect of this disclosure.

To update the history vector the processor may be configured to shift each bit along the history vector to represent the M consecutive sequence numbers lower than the current highest sequence number accepted by the node, wherein the first bit is set to represent the current highest sequence number accepted by the node. This is described in the IEEE 802.1CB standard vector sequence recovery method.

To update the history vector the processor may be configured to update each of the M bits to represent the M consecutive sequence numbers lower than the current highest sequence number accepted by the node.

The length of the history vector (e.g. M+1) may be defined by a history length stored in the memory.

Optionally, the future range defines M+1 sequence numbers immediately higher than the current highest sequence number accepted by the node.

The history vector and the packet loss counter may be as defined in the IEEE 802.1CB standard.

Optionally, the current highest sequence number accepted by the node is defined by a RecovSeqNum variable stored in the memory, as defined in the IEEE 802.1CB standard.

The processor may be configured to output the current value of the packet loss counter as an indication of the number of lost packets in the network.

Optionally, the node is a networking device or a bridge.

According to a third aspect, the present disclosure provides a time-sensitive network (TSN) comprising a plurality of inter-connected nodes as described in any embodiment or aspect of the second aspect of the disclosure.

The time-sensitive network (TSN) may be an in-vehicle network.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

Figure 1:
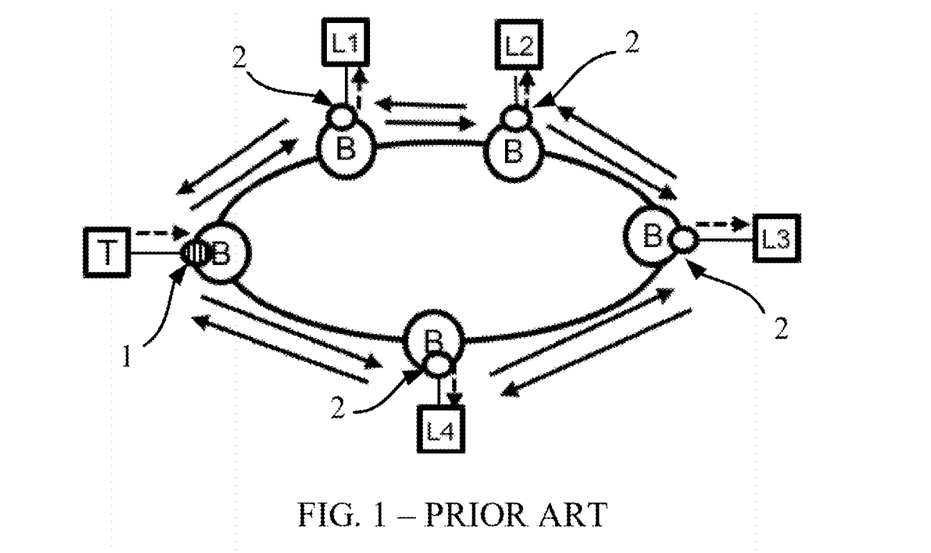
FIG. 1 shows a prior art representation of a TSN forwarding a packet in broadcast mode.

FIG. 1 shows a prior art representation of a time-sensitive network (TSN) for a packet forwarded in broadcast mode. For example, the TSN may be an Ethernet ring. The network comprises a talker or host node, T, which is connected to a plurality of listeners, L1, L2, L3, L4, by a plurality of bridges (or bridge ports) B. Each of the bridges B is a node in the TSN.

The bridge B in direct communication with the talker T executes a sequence generation function 1 which is configured to replicate packets transmitted by the talker T and to allocate a sequence number to each packet (or frame). In accordance with the IEEE 802.1CB standard for Frame Replication and Elimination for Reliability (FRER), the bridge sends duplicate copies of each packet over multiple disjoint paths in the network. This ensures reliability, as even if there is a fault along one path of the network, the packets should still be safely received by the listeners L1, L2, L3, L4.

Each of the bridges B connected to one of the listeners L1, L2, L3, L4 are configured to execute a sequence recovery function 2. In broadcast mode, packets are transmitted to each of the listeners, so all of the sequence recovery functions 2 are used. The sequence number allocated to a packet is effectively an identification number. The sequence recovery functions 2 use the sequence numbers of the received packets to accept packets and to discard duplicate or rogue packets.

Figure 2:
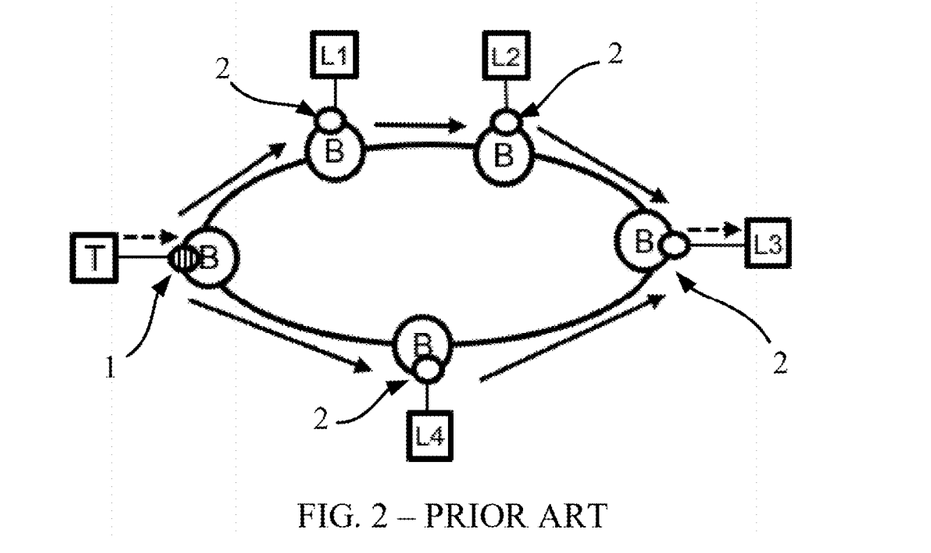
FIG. 2 shows a prior art representation of a TSN forwarding a packet in unicast mode.

FIG. 2 shows the same TSN network as in FIG. 1 but for a packet forwarded in unicast mode. In this example, only the bridge connected to listener L3 executes a sequence recovery function 2. The other bridges simply forward the received packets along the network.

Figure 3:
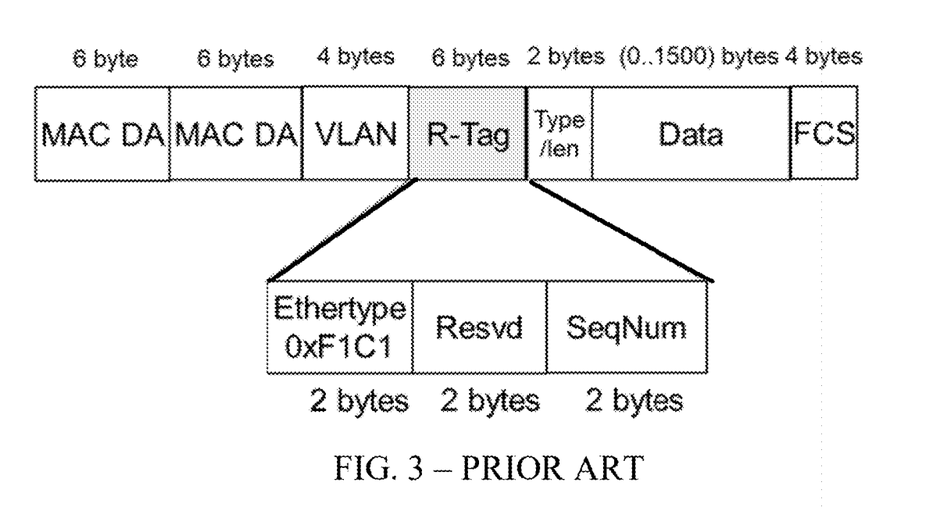
FIG. 3 is a diagram showing the components in an Ethernet frame according to the prior art.

FIG. 3 is a diagram showing the components in an Ethernet frame (according to the prior art). As illustrated, the sequence number (SeqNum) is contained in the Redundancy tag (R-tag) of the frame.

Figure 4:
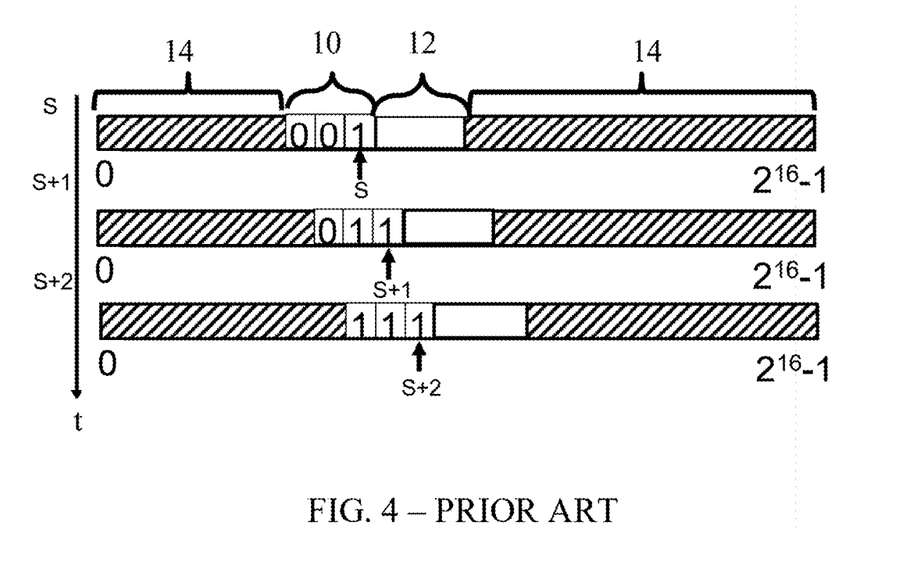
FIG. 4 is a logical representation of a sequence recovery process according to the prior art.

FIG. 4 shows a logical view of a sequence recovery function with a modulo sequence recovery space of $2^{16}$ sequence numbers, wherein the top diagram is at an earliest time and the bottom diagram is at a later time. The IEEE 802.1CB standard sequence recovery function defines a history vector 10 and a future range 12. The history vector 10 is configured to store or represent a set of sequence numbers accepted by the node. A first bit of the history vector 10 represents a current highest sequence number accepted by the node. The remaining bits of the history vector 10 represent a predetermined number of consecutive sequence numbers that are immediately lower (or earlier) than the current highest sequence number. An unset bit in the history vector indicates that the sequence number corresponding to that bit has not been accepted by the node. A set bit in the history vector 10 indicates that the sequence number corresponding to that bit has been accepted by the node. In FIG. 4, an unset bit has a value of 0 and a set bit has a value of 1, but this is not limiting.

The future range 12 defines a predetermined number of consecutive sequence numbers that are immediately higher (or later) than the current highest sequence number accepted by the node.

According to the standard, the history vector 10 and the future range 12 both have the same length, which is called the history length (HLEN). In FIG. 4, the sequence history length is 3, thus the history vector 10 comprises three bits representing three sequence numbers. The history vector, the future range and the history length (HLEN) are both well-known terms of the art, as would be appreciated by the skilled person. Generally, the history length is small (less than 16 sequence numbers) and is determined based on the highest latency difference between the shortest and longest path between the source node (i.e. talker) and the destination node's (i.e. listener's) sequence recovery function. This latency difference is then converted to the number of packets (representing the sequence history length) based on the stream rate and packet size.

The remainder of the sequence recovery space not taken up by the history vector 10 or the future range 12 is often called the rogue range 14.

In FIG. 4, at the earliest time the sequence number S is the current latest sequence number accepted by the node (which does not include any rogue discarded sequence numbers). The sequence generation and recovery functions typically use modulo arithmetic, such that there is a rollover of sequence numbers at the maximum sequence number. The initialization (or minimum) sequence number is therefore considered to be higher (or later) than the maximum possible sequence number.

The current highest sequence number accepted by the node is stored in a memory. The current highest sequence number is usually identified by the RecovSeqNum function. The IEEE 802.1CB standard defines the RecovSeqNum variable as follows: The RecovSeqNum variable holds the highest sequence number value received (in modulo RecovSeqSpace), or the value (RecovSeqSpace−1), if no sequence numbers have been received since the sequence recovery function was reset. The variable is an unsigned integer in the range 0 to (RecovSeqSpace−1). RecovSeqSpace is defined in section 7.4.3.2.1 of the IEEE 802.1CB standard. The RecovSeqNum is initialized to (RecovSeqSpace−1) whenever the function is reset (see section 7.4.3.3 of the standard). When the RecovSeqNum is incremented past its maximum value, the new value is 0.

If the node receives a packet having a sequence number that is outside of the history vector 10 and the future range 12 (i.e. within the rogue range 14) then the packet is discarded as a rogue packet. If the node receives a packet having a sequence number that is within the history vector 10 or the future range 12 then the packet is accepted. As long as the accepted packet is not a duplicate packet, the history vector 10 is updated to indicate that a packet having the sequence number has been received, as defined in the IEEE 802.1CB standard.

When the sequence recovery function at the node is reset or initialized, then according to the IEEE 802.1CB standard, each bit in the history vector 10 is unset (i.e. has a value of 0). This initialization may occur when a node first boots up, or during run time for example if a talker is dead for a given amount of time.

As shown in FIG. 4, following the initialization according to the IEEE 802.1CB standard, when the first packet is received having a sequence number S, the first bit of the history vector 10 represents the sequence number S. The first bit in the history vector 10 is then set (i.e. has a value of 1) indicating that sequence number S has been accepted by the node. A second packet having a sequence number S+1 then arrives at the node. As the sequence number S+1 is higher (i.e. later) than S, the sequence number S+1 is stored as the current highest sequence number accepted by the node. Thus, the arrival of sequence number S+1 causes the history vector 10 to be updated, as the first bit of the history vector now represents sequence number S+1. The remaining bits within the history vector are updated accordingly to represent sequence numbers S+1 and S. As shown in FIG. 4, this updating of the history vector can logically be thought of as shifting the previous bits of the history vector 10 to the left and setting the first bit of the history vector. This means that an unset bit (having a value of 0) representing sequence number S−2 is shifted out of the history vector 10, as the history vector 10 has a fixed length. According to the IEEE 802.1CB standard, the packet loss counter is incremented, as a packet having the sequence number S−2 was not received.

Similarly, when a third packet having sequence number S+2 is received by the node, the current highest sequence number is updated to be S+2. The history vector 10 is updated by shifting the previous bits to the left and setting the first bit of history vector, as the first bit now represents sequence number S+2. This results in the unset bit representing sequence number S−1 being shifted out of the history vector 10. According to the IEEE 802.1CB standard, the packet loss counter is incremented again, as a packet having the sequence number S−1 was not received by the node.

However, it is likely that packets S−2 and S−1 were not actually lost in the network, as the first sequence number received after the reset was S and the subsequent packets have all been received in chronological order. Thus, sequence numbers S−2 and S−1 may not have been transmitted in the network.

Thus, in the IEEE 802.1CB standard, the sequence recovery algorithm causes loss packet counts to be incremented up to the history length (length of the history vector 10) even though no packets may have been lost. This problem occurs after every reset or initialization of the sequence recovery function.

The packet loss counter is important as it allows users to determine if there is any loss in their network, as losses indicate the redundancy feature is failing and the system needs servicing. Having an inaccurate loss count will cause unnecessary work and stress for the user when there may be no problem with their network.

Figure 5:
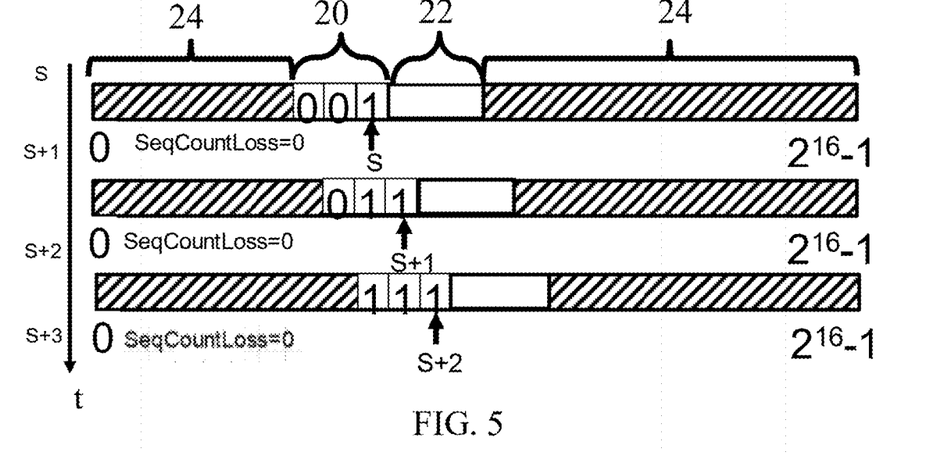
FIG. 5 is a logical representation of a sequence recovery process according to an embodiment of this disclosure.
Figure 6:
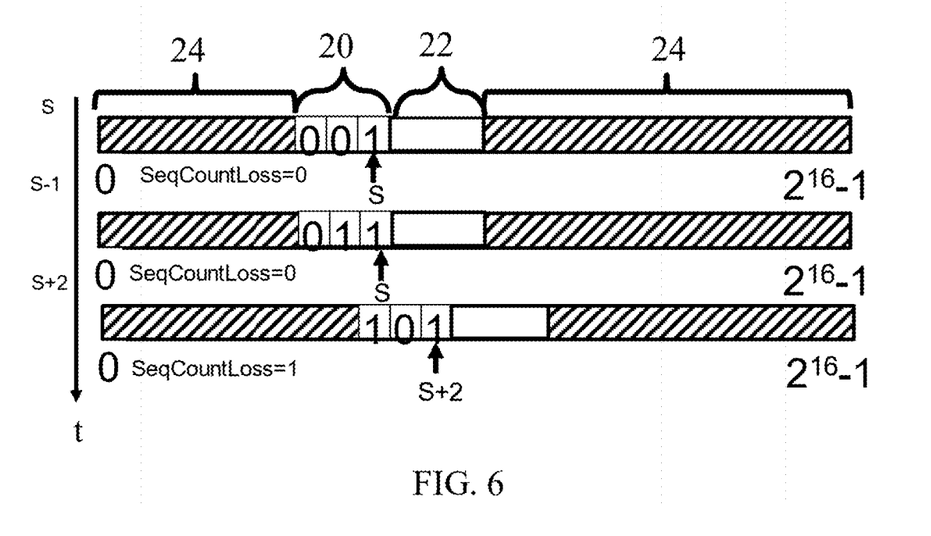
FIG. 6 is a logical representation of a sequence recovery process according to an embodiment of this disclosure.

The present disclosure provides a solution which improves the accuracy of the packet loss counter, as show in FIGS. 5 and 6.

FIG. 5 is a diagram showing packets arriving in order at a node, according to an embodiment of this disclosure. As per the standard, the present disclosure provides a history vector 20 and a future range 22. The history vector 20 and the future range 22 have a length equal to the history length (HLEN), which in FIG. 5 is equal to 3. It will be appreciated that the history length is not limited to 3.

If a packet is received by the node having a sequence number outside of the history vector 20 and the future range 22 (i.e. within the rogue range 24), then the packet is discarded as a rogue packet.

This disclosure enhances the standard vector sequence recovery algorithm by introducing a new state variable. The new state variable reduces the risk of packets being incorrectly counted as lost packets following the reset or initialization of the sequence recovery function. The state variable has a first state in which the packet loss counter is disabled and a second state in which the packet loss counter is enabled. In FIGS. 5 and 6, in the first state the state variable is set to 0 and in the second state the state variable is set to 1, but it will be appreciated that this is not limiting. This new state variable is referred to below as SeqCountLoss, but it may have any name.

Following the reset or initialization of the sequence recovery method, each bit in the history vector 20 is unset (i.e. has a value of 0), the packet loss counter is set to an initial value (e.g. 0) and the state variable SeqCountLoss is set to the first state to disable the packet loss counter. In the history vector 20, an unset bit (e.g. bit value 0) indicates that the corresponding sequence number has not been accepted by the node, and a set bit (e.g. bit value 1) indicates that the corresponding sequence number has been accepted by the node.

A first packet having a sequence number S is then received by the node. As this is the current highest sequence number accepted by the node, the first bit of the history vector 20 represents sequence number S. The first bit of the history vector 20 is then set representing sequence number S has been received by the node.

A second packet having a sequence number S+1 then arrives at the node. As the sequence number S+1 is within the future range 22 this packet is accepted. The sequence number S+1 is higher (or later) than S, so the arrival of sequence number S+1 causes the history vector 20 to be updated. The first bit of the history vector 20 now represents sequence number S+1 and so the remaining bits of the history vector 20 are updated to represent sequence numbers S and S−1. Logically, updating the history vector can be thought of as shifting the previous bits of the history vector left and setting the first bit of the history vector. This means that an unset bit (having a value of 0) representing sequence number S−2 is shifted out of the updated history vector 20. However, the packet loss counter is not incremented as the state variable SeqCountLoss is in the first state (e.g. 0) which disables the packet loss counter. Thus, in the present disclosure the packet having sequence number S−2 is not erroneously counted as a loss packet.

A third packet having a sequence number S+2 then arrives at the node. As the sequence number S+2 is within the future range 22 this packet is accepted. The sequence number S+2 is higher (or later) than S+1, so the arrival of sequence number S+2 causes the history vector 20 to be updated. The first bit of the history vector 20 now represents sequence number S+2 and so the remaining bits of the history vector are updated accordingly. Logically, updating the history vector 20 can be thought of as shifting the previous bits of the history vector left and setting the first bit. This means that an unset bit (having a bit value of 0) representing sequence number S−1 is shifted out of the updated history vector 20. Again, because the state variable SeqCountLoss is still in the first state (e.g. 0) the packet loss counter is not incremented, so the packet having sequence number S−1 is also not erroneously counted as a loss packet.

If a fourth packet was to be received at the node having a sequence number S+3, then the set bit representing sequence number S would be shifted out of the updated history vector 20. In response, the state variable SeqCountLoss would be set to the second state (e.g. 1) thereby enabling the packet loss counter. The packet loss counter would not be incremented until an unset bit (e.g. having a value of 0) was shifted out of the history vector 20, indicating that a packet has been lost.

An embodiment of this disclosure showing packets arriving out of order at the node is shown in FIG. 6. Following the initialization process described in relation to FIG. 5, a first packet having a sequence number S is received by the node. As this is the current highest sequence number accepted by the node, the first bit of the history vector 20 is set (e.g. has a value of 1) representing that sequence number S has been accepted by the node.

A second packet is then received by the node having a sequence number S−1. The sequence number S−1 is lower (or earlier) than the sequence number S, indicating that this packet has arrived out of chronological order at the node. As sequence number S−1 is within the history vector 20, the second bit in the history vector 20 is set (e.g. set to a value of 1), indicating that sequence number S−1 has been accepted by the node. As no sequence numbers have been shifted out of the history vector 20, the state variable SeqCountLoss remains set to the first state (e.g. 0) and there is no change to the packet loss counter.

A third packet having a sequence number S+2 is then received by the node. As the sequence number S+2 is within the future range 22 this packet is accepted. The sequence number S+2 is higher (or later) than S, so the arrival of sequence number S+2 causes the current highest sequence number and the history vector 20 to be updated. The first bit of the history vector 20 now represents sequence number S+2 and the previous bits in the history vector are shifted left. This means that an unset bit (having a bit value of 0)

representing sequence number S−2 and a set bit (having a value of 1) representing sequence number S−1 are both shifted out of the updated history vector 20. When the unset bit representing sequence number S−2 is shifted out of the history vector 20 the state variable SeqCountLoss is still set to the first state, thus the packet loss counter is disabled and does not increment. In response to the set bit representing sequence number S−1 being shifted out of the history vector 20, the state variable SeqCountLoss is set to the second state (e.g. SeqCountLoss=1). The packet loss counter does not increment, as sequence number S−1 was received by the node, so this is not a lost packet.

If a fourth packet having sequence number S+4 was subsequently received by the node, this would result in the set bit representing sequence number S and the unset bit representing sequence number S+1 being shifted out of the history vector 20. As the state variable SeqCountLoss is set to the second state (e.g. 1) then the packet loss counter is enabled. Thus, the packet loss counter would increment to count the packet having sequence number S+1 as a lost packet, as a packet having this sequence number was not accepted by the node.

As described above, in the present disclosure the new state variable (SeqCountLoss) enables the packet loss counter to increment to indicate a lost packet only if a set bit representing an accepted packet has been shifted out of the history vector 20. This provides a more accurate count of lost packets than the IEEE 802.1CB standard.

Figure 7:
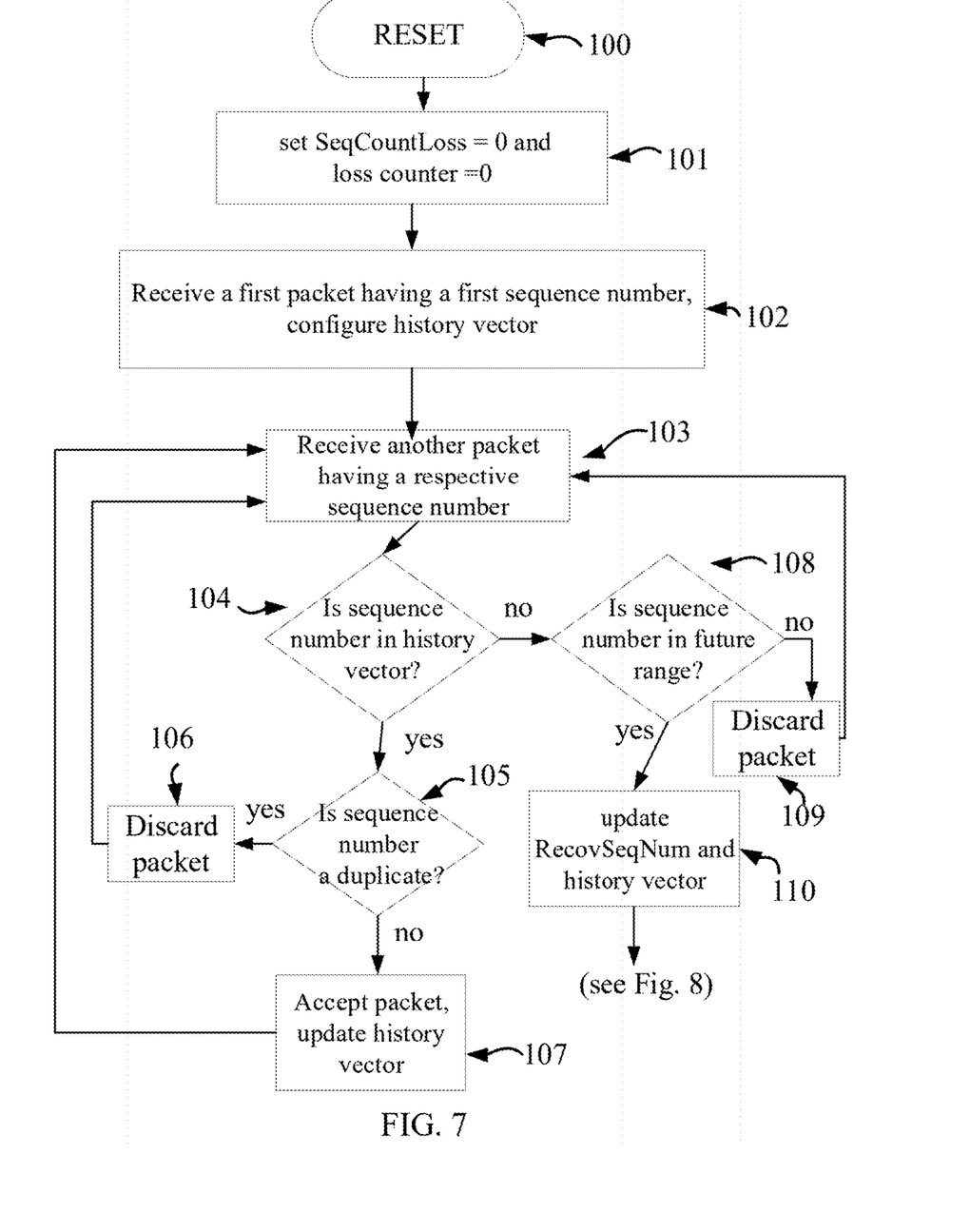
FIG. 7 is a flow diagram illustrating a portion of a sequence recovery method according to an embodiment of this disclosure.
Figure 8:
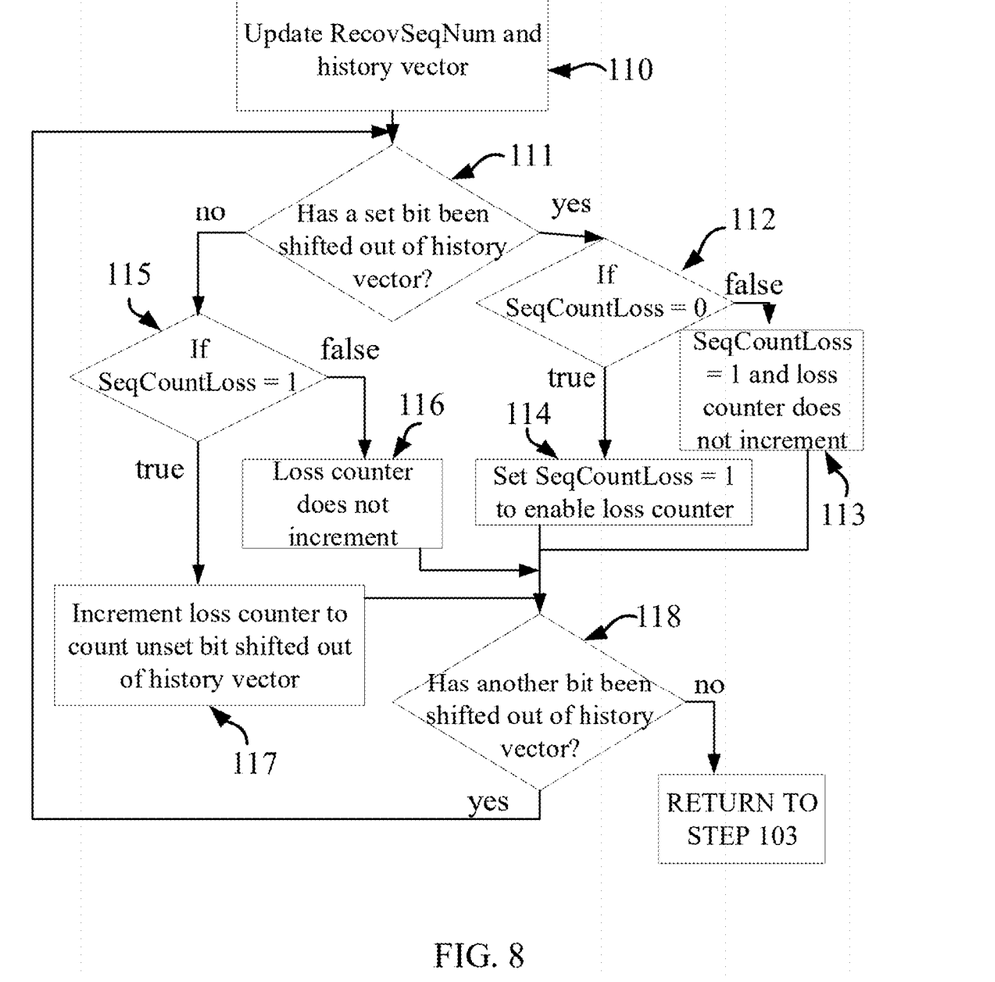
FIG. 8 is a flow diagram that is a continuation of FIG. 7.

The sequence recovery method according to an embodiment of this disclosure is also shown in the flow diagrams in FIGS. 7 and 8. FIG. 8 is a continuation of FIG. 7.

Firstly, as shown in FIG. 7, the sequence recovery method resets, at step 100. The packet loss counter is set to an initial value (e.g. 0) and the state variable SeqCountLoss is set to the first state (e.g. 0) to disable the packet loss counter (step 101). At step 102, a first packet is received having a first sequence number. The first bit of the history vector therefore represents the first sequence number. The first bit of the history vector 20 is set and the remaining M bits of the history vector are unset.

A further packet is then received by the node, the packet having a respective sequence number (step 103). The node checks whether the sequence number is within the history vector 20 as per the IEEE 802.1CB standard (step 104). If yes, then the node checks whether the sequence number has already been accepted by the node (i.e. is this a duplicate packet) (step 105). If the sequence number has already been received, in other words if the bit representing the sequence number in the history vector 20 is already set, the packet is discarded as a duplicate packet (step 106).

If the sequence number is not a duplicate, then the packet is accepted and the history vector is updated (step 107). This means that the relevant bit in the history vector is set, as per the IEEE 802.1CB standard.

If the sequence number is not within the history vector, the node determines whether it is within the future range (step 108). If no, then the packet is discarded as a rogue packet (step 109).

If the sequence number is within the future range, then the packet is accepted and the RecovSeqNum variable that defines the current highest sequence number is updated to store the sequence number as the current highest sequence number accepted by the node. The history vector is also updated such that the first bit represents the sequence number and the remaining M bits represent the M consecutive sequence number lower than the current highest sequence number (step 110). In other words, the first bit of the history vector remains set and the previous bits are shifted along the history vector.

The method then continues as shown in FIG. 8. Step 110 will result in at least one sequence number being shifted out of the updated history vector, as the history vector has a fixed length. At step 111, the node determines if the first bit to be shifted out of the updated history vector is a set bit (e.g. has a value of 1). If yes, and if the state variable SeqCountLoss is set to the first state (e.g. 0) (step 112) then the state variable SeqCountLoss is set to the second state (e.g. 1) to enable the packet loss counter (step 114). If the state variable SeqCountLoss is already set to the second state (e.g. 1) (step 113), then there is no change to the state variable and the packet loss counter does not increment.

Alternatively, if the first bit shifted out of the updated history vector is an unset bit, then at step 115 the node determines if the state variable SeqCountLoss is in the second state (i.e. SeqCountLoss=1). If no, then SeqCountLoss=0 and the packet loss counter is disabled, so the packet loss counter does not increment (step 116). If yes, then packet loss counter is enabled so the packet loss counter increments to count the packet having the sequence number represented by the unset bit as a lost packet (step 117).

At step 118 the node determines whether a second bit was shifted out of the updated history vector. If yes, then the node returns to step 111 to repeat the above process. If no, then the node returns to step 103 to wait for another packet to be received.

Accordingly, there has been described a sequence recovery method executed by a node in a time-sensitive network configured to transmit and receive packets, the method comprising providing a state variable configured to indicate when a packet should be counted as a lost packet. The state variable has a first state in which a packet loss counter is disabled and a second state in which the packet loss counter is enabled. Thus, the packet loss counter can only increment to count lost packets when the loss state variable is in the second state. This method enhances the IEEE 802.1CB standard.

A node as described above, as well as a TSN including a plurality of said nodes, also forms part of this disclosure.

Although particular embodiments of this disclosure have been described, it will be appreciated that many modifications/additions and/or substitutions may be made within the scope of the claims.

The invention claimed is:

1. A sequence recovery method executed by a node in a time-sensitive network configured to transmit and receive packets, the node having therein:
   a history vector, wherein a first bit of the history vector represents a current highest sequence number accepted by the node and a remaining M bits represent M consecutive sequence numbers lower than the current highest sequence number accepted by the node;
   a packet loss counter; and
   a state variable, having a first state in which the packet loss counter is disabled and a second state in which the packet loss counter is enabled;
   the method comprising:
   setting the packet loss counter to an initial value and setting the state variable to the first state;
   receiving a first packet having a first sequence number;
   configuring the history vector such that the first bit representing the first sequence number is set and the remaining M bits are unset;

individually receiving a plurality of packets each having a respective sequence number, and for each received sequence number:
  in response to the sequence number being within a future range, wherein the future range defines a set of consecutive sequence numbers higher than the current highest sequence number accepted by the node:
    storing the sequence number as the current highest sequence number accepted by the node and updating the history vector accordingly;
    in response to a set bit being shifted out of the updated history vector when the state variable is in the first state, setting the state variable to the second state; and
    in response to an unset bit being shifted out of the updated history vector, incrementing the packet loss counter only if the state variable is in the second state.

2. The sequence recovery method of claim 1, wherein updating the history vector comprises shifting each of the bits along the history vector to represent the M consecutive sequence numbers lower than the current highest sequence number accepted by the node, wherein the first bit is set to represent the current highest sequence number accepted by the node.

3. The sequence recovery method of claim 1, further comprising:
  in response to the sequence number being outside the history vector and the future range, discarding the packet.

4. The sequence recovery method of claim 1, further comprising:
  in response to the sequence number being within the history vector, updating the history vector such that the bit representing the sequence number is set.

5. The sequence recovery method of claim 4, further comprising:
  in response to the sequence number being within the history vector, discarding the packet if the bit representing the sequence number is already set.

6. A node for a time-sensitive network configured to transmit and receive packets, the node comprising:
  a receiver;
  a memory configured to store:
    a current highest sequence number accepted by the node;
    a history vector, wherein a first bit of the history vector represents the current highest sequence number accepted by the node and a remaining M bits represent M consecutive sequence numbers lower than the current highest sequence number accepted by the node;
    a packet loss counter; and
    a state variable, having a first state in which the packet loss counter is disabled and a second state in which the packet loss counter is enabled;
  a processor, wherein the processor is configured to:
  set the packet loss counter to an initial value and set the state variable to the first state;
  in response to the receiver receiving a first packet having a first sequence number, configure the history vector to set the first bit wherein the remaining M bits are unset;
  in response to the receiver individually receiving a plurality of packets each having a respective sequence number, for each sequence number received:
    in response to the sequence number being within a future range, wherein the future range defines a set of consecutive sequence numbers higher than the current highest sequence number accepted by the node:
      store the sequence number in the memory as the current highest sequence number accepted by the node and update the history vector accordingly;
      in response to a set bit being shifted out of the updated history vector when the state variable is in the first state, set the state variable to the second state; and
      in response to an unset bit being shifted out of the updated history vector, increment the packet loss counter only if the state variable is in the second state.

7. The node of claim 6, wherein the processor is configured to perform the sequence recovery method.

8. The node of claim 6, wherein to update the history vector the processor is configured to shift each bit along the history vector to represent the M consecutive sequence numbers lower than the current highest sequence number accepted by the node, wherein the first bit is set to represent the current highest sequence number accepted by the node.

9. The node of claim 6, wherein the future range defines M+1 sequence numbers immediately higher than the current highest sequence number accepted by the node.

10. The node of claim 6, wherein the history vector and the packet loss counter are as defined in the IEEE 802.1CB standard.

11. The node of claim 6, wherein the processor is configured to output a current value of the packet loss counter as an indication of the number of lost packets in the time-sensitive network.

12. The node of claim 6, wherein the node is a networking device or a bridge.

13. The node of claim 6, wherein the processor is further configured to:
  in response to the sequence number being outside the history vector and the future range, discard the packet.

14. The node of claim 6, wherein the processor is further configured to:
  in response to the sequence number being within the history vector, update the history vector such that the bit representing the sequence number is set.

15. The node of claim 14, wherein the processor is further configured to:
  in response to the sequence number being within the history vector, discard the packet if the bit representing the sequence number is already set.

16. A time-sensitive network comprising a plurality of inter-connected nodes, wherein each node is configured to transmit and receive packets, each node comprising:
  a receiver;
  a memory configured to store:
    a current highest sequence number accepted by the node;
    a history vector, wherein a first bit of the history vector represents the current highest sequence number accepted by the node and a remaining M bits represent M consecutive sequence numbers lower than the current highest sequence number accepted by the node;
    a packet loss counter; and
    a state variable, having a first state in which the packet loss counter is disabled and a second state in which the packet loss counter is enabled;
  a processor, wherein the processor is configured to:
    set the packet loss counter to an initial value and set the state variable to the first state;

in response to the receiver receiving a first packet having a first sequence number, configure the history vector to set the first bit wherein the remaining M bits are unset;

in response to the receiver individually receiving a plurality of packets each having a respective sequence number, for each sequence number received:

in response to the sequence number being within a future range, wherein the future range defines a set of consecutive sequence numbers higher than the current highest sequence number accepted by the node:

store the sequence number in the memory as the current highest sequence number accepted by the node and update the history vector accordingly;

in response to a set bit being shifted out of the updated history vector when the state variable is in the first state, set the state variable to the second state; and in response to an unset bit being shifted out of the updated history vector, increment the packet loss counter only if the state variable is in the second state.

17. The time-sensitive network of claim 16, wherein the time-sensitive network is an in-vehicle network.

18. A vehicle comprising the in-vehicle network of claim 17.

* * * * *